(12) United States Patent
Nagel et al.

(10) Patent No.: US 10,415,554 B2  
(45) Date of Patent: Sep. 17, 2019

(54) DRIVE MECHANISM MODULE FOR A RECIPROCATING PUMP

(71) Applicant: A.H.M.S., Inc., Edmonton, Alberta (CA)

(72) Inventors: Carey Philip Nagel, Edmonton (CA); Floyd James Guest, Bashaw (CA); Pierre-Alexandre Poirier, Ottawa (CA); Nabeel Salih, Edmonton (CA)

(73) Assignee: A.H.M.S., Inc., Edmonton, Alberta (CA)

( * ) Notice: Subject to any disclaimer, the term of this patent is extended or adjusted under 35 U.S.C. 154(b) by 127 days.

(21) Appl. No.: 15/552,301

(22) PCT Filed: Feb. 23, 2016

(86) PCT No.: PCT/CA2016/050178  
§ 371 (c)(1),  
(2) Date: Aug. 21, 2017

(87) PCT Pub. No.: WO2016/134464  
PCT Pub. Date: Sep. 1, 2016

(65) Prior Publication Data  
US 2018/0045187 A1    Feb. 15, 2018

Related U.S. Application Data

(60) Provisional application No. 62/120,658, filed on Feb. 25, 2015.

(51) Int. Cl.  
*F04B 9/04*    (2006.01)  
*F04B 17/00*   (2006.01)  
(Continued)

(52) U.S. Cl.  
CPC ............... *F04B 9/045* (2013.01); *F04B 9/04* (2013.01); *F04B 17/00* (2013.01); *F16C 32/064* (2013.01); *F04B 53/16* (2013.01); *F16C 2326/06* (2013.01)

(58) Field of Classification Search  
CPC .............................. F04B 9/045; F01B 9/023  
See application file for complete search history.

(56) References Cited

U.S. PATENT DOCUMENTS 4,013,048 A * 3/1977 Reitz ................. F01B 9/023  
                                              123/197.2  
4,512,291 A * 4/1985 Kirk ................. F02B 75/222  
                                              123/196 M  
(Continued)

FOREIGN PATENT DOCUMENTS

AR         068874 A1   12/2009  
BR      PI0904045 A2   12/2010  
(Continued)

*Primary Examiner* — Thomas E Lazo  
(74) *Attorney, Agent, or Firm* — Adler Pollock & Sheehan P.C

(57) ABSTRACT

A drive mechanism module for use in a reciprocating pump converts rotational movement of a drive shaft to reciprocating movement of a reciprocating pump component transversely to the drive shaft. The drive mechanism module includes a connection member for attachment to the reciprocating pump component, a translating member that drives movement of the connection member in a first transverse direction while reciprocatingly translating in a second transverse direction relative to the connection member, a rotating member that rotates eccentrically with the drive shaft, and a rotary bearing assembly that permits rotation of the rotating member relative to the translating member while driving transverse movement of the translating member. The drive mechanism module may define a bearing fluid path for creating a hydrostatic or hydrodynamic fluid bearing at the (Continued)

interface of the connection member and the translating member.

11 Claims, 14 Drawing Sheets

(51) Int. Cl.
*F16C 32/06* (2006.01)
*F04B 53/16* (2006.01)

(56) References Cited

U.S. PATENT DOCUMENTS

| | | | |
|---|---|---|---|
| 5,030,065 A * | 7/1991 | Baumann | F04B 9/045 |
| | | | 417/273 |
| 5,649,809 A * | 7/1997 | Stapelfeldt | F04B 9/045 |
| | | | 417/413.1 |
| 7,481,629 B2 * | 1/2009 | Winter | F04B 1/0413 |
| | | | 417/273 |
| 7,878,081 B2 * | 2/2011 | Sundheim | F04B 27/005 |
| | | | 74/50 |
| 8,418,493 B2 * | 4/2013 | Chang | F04B 9/042 |
| | | | 417/273 |
| 9,011,111 B2 | 4/2015 | Lesko | |
| 9,051,833 B2 * | 6/2015 | Diggs | F01B 15/02 |
| 2004/0213689 A1 * | 10/2004 | Mori | F04B 1/0413 |
| | | | 417/470 |
| 2011/0286867 A1 | 11/2011 | Lesko | |
| 2013/0098335 A1 * | 4/2013 | Diggs | F01B 15/02 |
| | | | 123/45 R |

FOREIGN PATENT DOCUMENTS

| | | |
|---|---|---|
| CA | 2737321 A1 | 11/2011 |
| CA | 2737321 C | 9/2013 |
| CN | 101560968 A | 10/2009 |
| CN | 101560968 B | 2/2013 |
| CN | 102959244 A | 3/2013 |
| EP | 2177758 A1 | 4/2010 |
| WO | WO-2009070876 A1 | 6/2009 |
| WO | WO-2011143746 A1 | 11/2011 |

* cited by examiner

DRIVE MECHANISM MODULE FOR A RECIPROCATING PUMP

CROSS REFERENCE TO RELATED APPLICATIONS

This application is a National Phase application filed under 35 U.S.C. § 371 of PCT International Application No. PCT/CA2016/050178 with an International Filing Date of Feb. 23, 2016, which claims priority to U. S. Patent Application No. 62/120,658 with a filing date of Feb. 25, 2015, the entire contents of which are incorporated herein by reference.

TECHNICAL FIELD

The present invention relates to a drive mechanism module for converting rotational motion of a drive shaft to reciprocating motion of a reciprocating pump component.

BACKGROUND OF THE INVENTION

A conventional reciprocating pump comprises a rotating crankshaft pivotally attached to a connecting rod, which is in turn pivotally connected to a pump component such as a plunger, a piston or a diaphragm, to convert rotational movement of the crankshaft to linear reciprocating movement of the pump component. Such conventional pumps, however, may be expensive and time consuming to produce, repair and maintain due to the number and complexity of mechanical parts, and the potential need to disassemble the entire pump even if damage is isolated to a particular part.

United States Patent Application Publication No. 2011/0286867 A1 to Lesko discloses a mud pump that includes a frame, a pump module, a pump shaft having an eccentric lobe, a slide movable linearly side-to-side within the frame, a connecting rod having a first end on the eccentric lobe and a second end rotatably pinned to the slide, and a piston rod assembly coupling the slide to the pump module. Rotation of the pump shaft causes the slide to move side-to-side within the frame, which in turn causes the piston rod assembly to operate the pump module in a side-to-side motion.

United States Patent Application Publication No. 2012/0097025 A1 to Fritsch discloses a drive mechanism for oscillating positive-displacement machines such as a diaphragm pump. The drive mechanism comprises an eccentric shaft and a plurality of piston rods. The piston rods are connected to the eccentric shaft by way of a sliding unit guide so that rotation of the eccentric shaft produces an oscillating linear movement of the piston rods.

There remains a need in the art for a drive mechanism that converts rotating motion of a drive shaft to reciprocating motion of a reciprocating pump component that can be used in various types of reciprocating pumps. Preferably, such a drive mechanism is economical and convenient to manufacture, operate and service, and allows for desirable pump characteristics such as a compact layout, reduced internal friction and smooth discharge of the working fluid, while maintaining adequate pump capacity and power.

SUMMARY OF THE INVENTION

The present invention relates to a drive mechanism module for converting rotational motion of a drive shaft to reciprocating motion of a reciprocating pump component.

In one aspect, the present invention comprises a drive mechanism module for use in a reciprocating pump comprising a drive shaft and at least one reciprocating pump component. It is contemplated that the at least one reciprocating pump component may be one or a combination of a plunger, a piston, or a diaphragm. The drive shaft defines a drive shaft axis of rotation and transverse directions perpendicular to the drive shaft axis. The at least one reciprocating pump component is reciprocatingly moveable relative to the drive shaft in a first transverse direction while limited in movement relative to the drive shaft in a second transverse direction different from the first transverse direction.

The drive mechanism module comprises at least one connection member, a translating member, a rotating member, and a rotary bearing assembly. The at least one connection member is for attachment to the at least one reciprocating pump component. The translating member is in bearing engagement with the connection member for transferring bearing forces in the first transverse direction from the translating member to the connection member while translationally movable in the second transverse direction relative to the connection member. The rotating member is coupled to the drive shaft for rotation with the drive shaft, and has a rotating member center transversely eccentric to the drive shaft axis. The rotary bearing assembly is attached to the translating member and the rotating member to permit rotation of the rotating member about the rotating member center relative to the translating member, while transferring transverse bearing forces from the rotating member to the translating member. Accordingly, rotation of the rotating member with the drive shaft drives transverse reciprocating motion of the translating member to drive reciprocating movement of the connection member in the first transverse direction while the translating member reciprocatingly translates in the second transverse direction relative to the connection member.

In embodiments of the drive mechanism module, the at least one connection member is removably attachable to the reciprocating pump component.

In embodiments of the drive mechanism module, the connection member forms part or all of a connection member assembly that transversely surrounds the translating member.

In embodiments of the drive mechanism module, the at least one connection member comprises a first connection member for connection to a first reciprocating pump component, and a second connection member for connection to a second reciprocating pump component, wherein the first and reciprocating pump components are opposed to each other in the first transverse direction.

In embodiments of the drive mechanism module, the translating member defines a translating member aperture that receives the rotary bearing assembly and the rotating member, and allows for through passage of the drive shaft.

In embodiments of the drive mechanism module, the connection member comprises a connection member engagement surface, and the translating member comprises a translating member engagement surface opposite the connection member engagement surface. The translating member engagement surface interfaces with the connection member engagement surface for transferring bearing forces in the first transverse direction from the translating member to the connection member. The translating member engagement surface slides relative to the connection member engagement surface for translational movement of the translating member in the second transverse direction relative to the connection member.

In embodiments of the drive mechanism module, the connection member may comprise a connection member first part and a connection member second part, wherein the connection member second part is removably attached to the connection member first part and comprises the connection member engagement surface. The translating member may comprise a translating member first part and a translating member second part, wherein the translating member second part is removably attached to the translating member first part and comprises the translating member engagement surface.

In embodiments of the drive mechanism module, the connection member may be selectively movable relative to the translating member for adjusting the distance between the connection member engagement surface and the translating member engagement surface. The drive mechanism module may further comprise a cam rod selectively rotatable to displace the connection member engagement surface relative to the translating member engagement surface.

In embodiments of the drive mechanism module, the connection member defines a bearing fluid path extending from a bearing fluid path inlet to a bearing fluid path outlet in fluid communication with a space between the connection member engagement surface and the translating member engagement surface.

In embodiments of the drive mechanism module, the rotating member defines a rotating member aperture for removably mounting the rotating member on the drive shaft.

In embodiments of the drive mechanism module, the rotary bearing assembly comprises a rotary bearing assembly outer race for attachment to the translating member, a rotary bearing inner race for attachment to the rotating member, and a plurality of rotary bearing assembly bearing elements to permit relative rotation between the rotary bearing assembly outer race and the rotary bearing assembly inner race.

In another aspect, the present invention comprises a reciprocating pump assembly. The reciprocating pump assembly comprises a power end frame, a drive shaft, at least one reciprocating pump component, and at least one drive mechanism. The drive shaft defines a drive shaft axis of rotation and transverse directions perpendicular to the drive shaft axis. The drive shaft is rotatable relative to the power end frame. The at least one reciprocating pump component is reciprocatingly moveable relative to the drive shaft in a first transverse direction while limited in movement relative to the drive shaft in a second transverse direction different from the first transverse direction. The at least one reciprocating pump component may be one or a combination of a plunger, a piston, or a diaphragm. The at least one drive mechanism may be in accordance with any one of the embodiments of the drive mechanism module as described above.

In one embodiment of the reciprocating pump assembly, the at least one drive mechanism module comprises at least one connection member, a translating member, a rotating member and a rotary bearing assembly. The at least one connection member is for attachment to the at least one reciprocating pump component. The translating member is in bearing engagement with the connection member for transferring bearing forces in the first transverse direction from the translating member to the connection member while translationally movable in the second transverse direction relative to the connection member. The rotating member is coupled to the drive shaft for rotation with the drive shaft. The rotating member has a rotating member center transversely eccentric to the drive shaft axis. The rotary bearing assembly is attached to the translating member and the rotating member to permit rotation of the rotating member about the rotating member center relative to the translating member, while transferring transverse bearing forces from the rotating member to the translating member. Accordingly, rotation of the rotating member with the drive shaft drives transverse reciprocating motion of the translating member to drive reciprocating movement of the connection member in the first transverse direction while the translating member reciprocatingly translates in the second transverse direction relative to the connection member.

In one embodiment of the reciprocating pump assembly, the connection member defines a bearing fluid path extending from a bearing fluid path inlet to a bearing fluid path outlet in fluid communication with a space between the connection member engagement surface and the translating member engagement surface.

In another aspect, the present invention comprises a method for converting rotational motion of a drive shaft defining a drive shaft axis of rotation and transverse directions perpendicular to the drive shaft axis to reciprocating movement of a reciprocating pump component in a first transverse direction, while the reciprocating pump component limited in movement in the second transverse direction relative to the drive shaft. The method comprising the steps of:

(a) rotating the drive shaft about the drive shaft axis to drive rotation of a rotating member having a rotating member center transversely eccentric to the drive shaft axis;

(b) allowing rotation of the rotating member to drive reciprocating transverse movement of a translating member;

(c) allowing reciprocating movement of the translating member to drive reciprocating movement in the first transverse direction of a connection member attached to the reciprocating pump component, while allowing the translating member to reciprocatingly translate in the second transverse direction relative to the connection member by relative sliding of a translating member engagement surface and a connection member engagement surface; and (d) concurrently with steps (a) to (c) circulating a bearing fluid under pressure to a space between the connection member engagement surface and the translating member engagement surface.

In one embodiment of the method, the bearing fluid is circulated under pressure sufficient to create a hydrostatic fluid bearing between the connection member engagement surface and the translating member engagement surface.

In one embodiment of the method, the translating member reciprocatingly translates in the second transverse direction relative to the connection member at a speed sufficient to create a hydrodynamic fluid bearing between the connection member engagement surface and the translating member engagement surface.

BRIEF DESCRIPTION OF DRAWINGS

In the drawings, like elements are assigned like reference numerals. The drawings are not necessarily to scale, with the emphasis instead placed upon the principles of the present invention. Additionally, each of the embodiments depicted is but one of a number of possible arrangements utilizing the fundamental concepts of the present invention. The drawings are briefly described as follows.

DETAILED DESCRIPTION

The present invention relates to a drive mechanism module for use with a reciprocating pump, to a reciprocating pump assembly, and methodologies of converting rotational movement of a drive shaft to reciprocating movement of a reciprocating pump component. Any term or expression not expressly defined herein shall have its commonly accepted definition understood by a person skilled in the art. As used herein, "reciprocating pump" refers to a device for pumping a working fluid, which device has a rotatable drive shaft and at least one reciprocating pump component which may be a plunger, a piston, a diaphragm or a combination of the foregoing. The drive shaft defines a drive shaft axis of rotation and transverse directions that are perpendicular to the drive shaft axis. The reciprocating pump component is reciprocatingly moveable relative to the drive shaft in a first transverse direction while limited in movement relative to the drive shaft in a second transverse direction that is different from the first transverse direction. As used herein, the expression "limited in movement" includes partial and complete restriction from movement.

The drive mechanism module and reciprocating pump assembly of the present invention will now be described having regard to the accompanying Figures. FIGS. 1-6 show an exemplary embodiment of a reciprocating pump (10) of the present invention or components thereof, including a drive mechanism module (60) of the present invention. FIGS. 7-16 show the exemplary embodiment of the drive mechanism module (60) of the present invention or components thereof. The following description and the accompanying drawings are of specific embodiments or particular uses of the invention, which are intended to be illustrative only. The terms and expressions used in the description are used herein as terms of description and not of limitation, and there is no intention in the use of such terms and expressions of excluding equivalents of the features shown and described or portions thereof. Various changes and modifications can be made to the specific embodiments and particular uses without departing from the scope of the invention as defined in the claims that follow.

Pump in General

Figure 1:
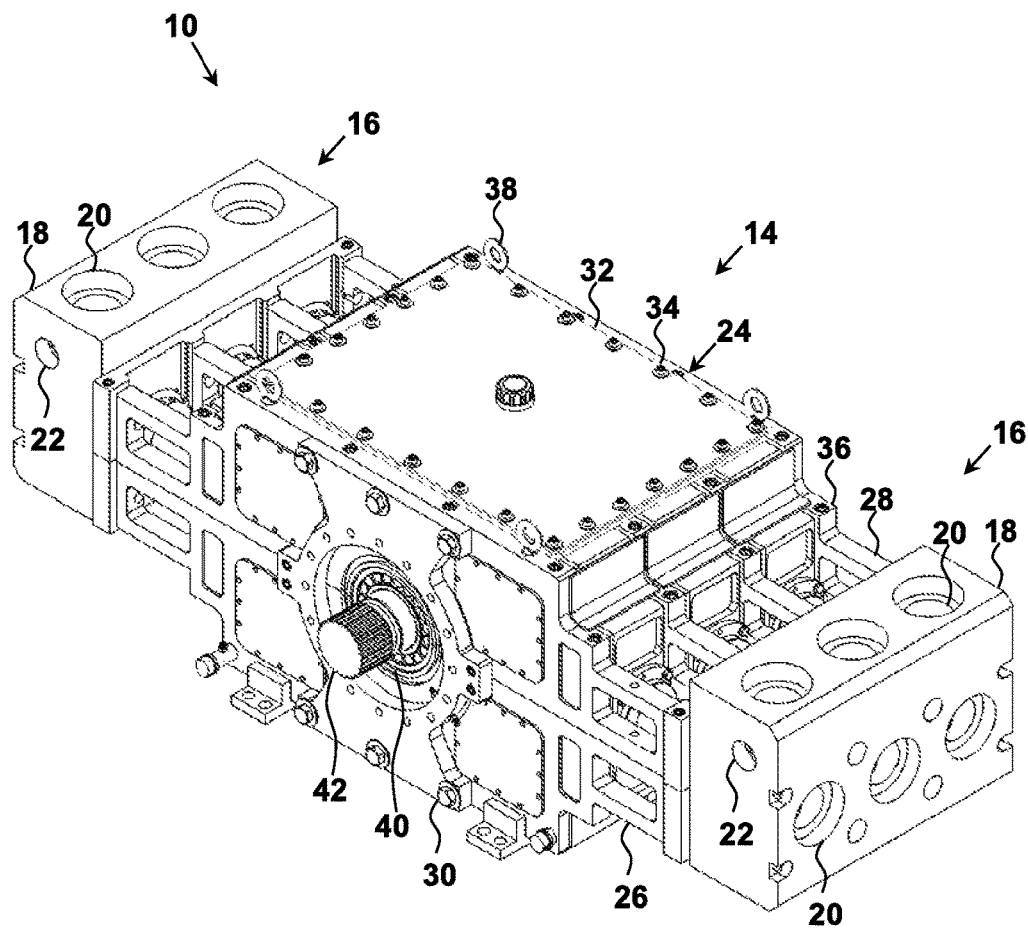
FIG. 1 is a perspective view of an embodiment of a reciprocating pump of the present invention comprising an embodiment of the drive mechanism module of the present invention.

Referring to FIGS. 1-7, the exemplary embodiment of the reciprocating pump (10) is a reciprocating plunger pump. As shown in FIG. 1, the pump (10) generally comprises a power end assembly (14) disposed between a pair of opposed fluid end assemblies (16). In other embodiments (not shown), the pump (10) may have a single fluid end assembly (16), or more than two fluid end assemblies (16). The pump (10) may be used to move working fluids (e.g., low viscosity chemicals, hot oils, ore slurries, drilling mud, brine, fracturing fluids, liquid nitrogen) in operations associated with oil and gas recovery (e.g., drilling, high pressure cleaning, reverse osmosis, hot oil applications, blow out prevention, pumping mud, and hydraulic fracturing). In the exemplary embodiment, the pump (10) may have a power output of approximately 600 horsepower.

Fluid End Assembly

Each fluid end assembly (16) controls the flow of the working fluid from a fluid inlet line (not shown) to a fluid outlet line (not shown). In the exemplary embodiment shown in FIG. 2, each fluid end assembly (16) comprises a fluid end assembly block (18) defining fluid end assembly block access ports (20), fluid end assembly block inlet ports (which are open on the bottom side of the fluid end assembly block (18) and concealed from view) and fluid end assembly block outlet ports (22). The fluid end assembly block inlet ports (not shown) and the fluid end assembly block outlet ports (22) may be in fluid communication to the fluid inlet line and fluid outlet line (not shown), respectively, by a fluid end assembly inlet manifold and a fluid end assembly outlet manifold (not shown), respectively. The fluid end assembly (16) may further comprise fluid end assembly inlet valves (not shown) and fluid end assembly outlet valves (not shown) disposed within the fluid end assembly block (18) to control the flow of the working fluid through the fluid end assembly block inlet ports (not shown) and fluid end assembly block outlet ports (22), respectively.

Power End Assembly

Figure 2:
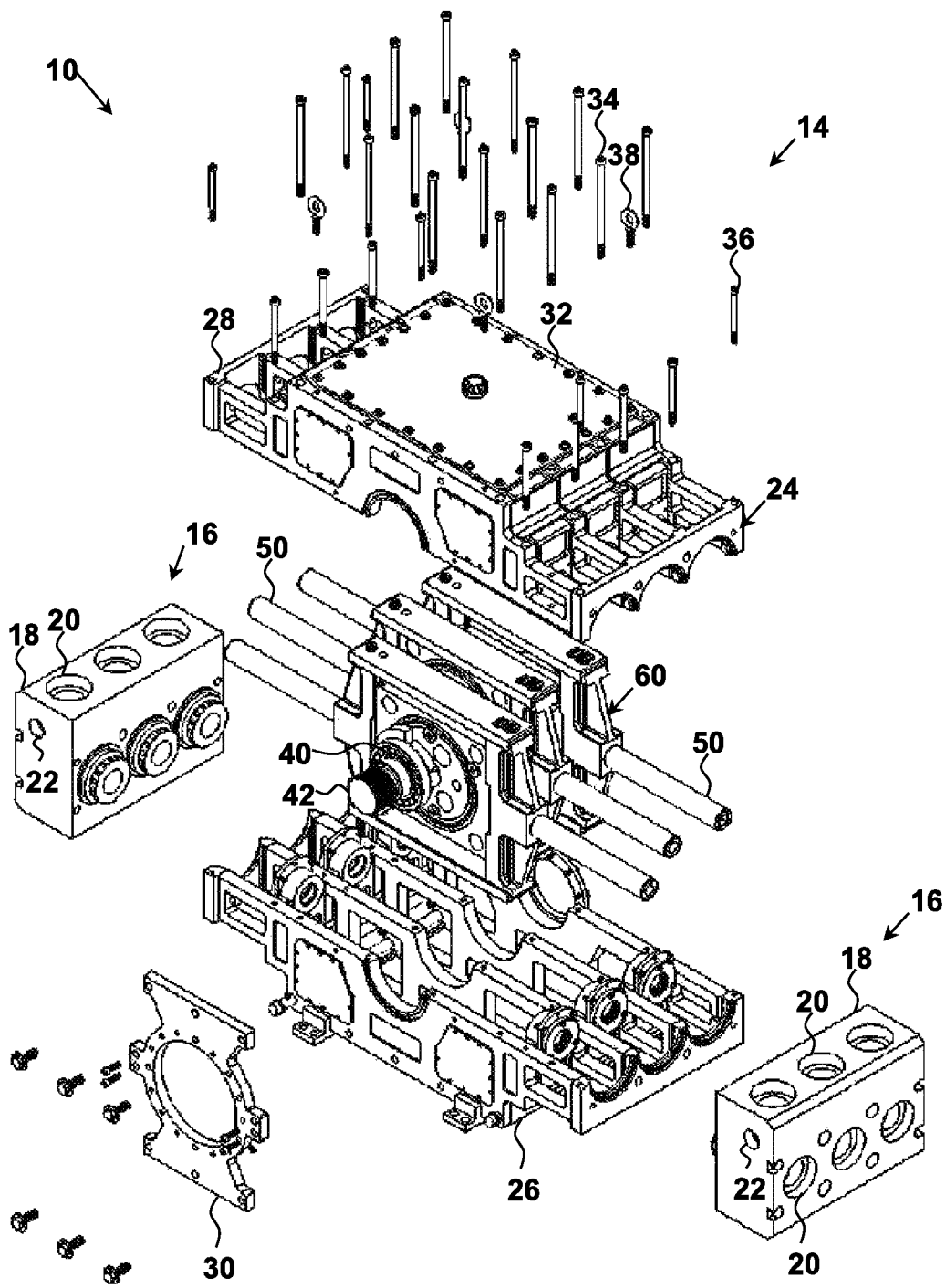
FIG. 2 is an exploded perspective view of the pump shown in FIG. 1.

The power end assembly (14) varies the working fluid pressure within the fluid end assembly (16) to alternately draw the working fluid into the fluid end assembly block (18) through fluid end assembly block inlet ports (not shown) and displace the working fluid out of the fluid end assembly block (18) through the fluid end assembly block outlet ports (22). Referring to FIG. 2, in the exemplary embodiment, the power end assembly (14) comprises a power end frame (24), a main bearing assembly (40), a drive shaft (42), reciprocating pump components in the form of six plunger rods (50), and three drive mechanism modules (60). The components of the power end assembly (14) may be constructed of any suitable material known in the art, including high strength alloy steels, such as American Iron and Steel Institute (AISI) grade 4340 alloy steel.

Power End Frame

The power end frame (24) fixedly retains the main bearing assembly (40). Referring to FIG. 2, in the exemplary embodiment, the power end frame (24) is formed by a power end frame lower portion (26), a power end frame upper portion (28), a power end frame torque plate (30), and a power end frame cover (32), all of which collectively form a pump housing that either entirely or partially encloses the drive mechanism modules (60). The power end frame cover (32) and the power end frame upper portion (28) may be removably attached by power end frame cover bolts (34) to allow for access to the drive mechanism modules (60) from the power end frame (24), without further disassembly of the power end frame (24). The power end frame lower portion (26), the power end frame upper portion (28), and the power end torque plate (30) are removably attached by power end frame bolts (36) to allow for access to and removal of the components, including the drive mechanisms (60), contained therein. In other embodiments (not shown), the drive mechanism modules (60) may be shaped and size so as to be removable from the power end frame (24) by merely removing the power end frame cover (32) without having to remove the power end frame upper portion (28) from the power end frame lower portion (26). In embodiments, the power end frame (24) may be mounted to a platform, to a skid or to a pump house. Power end frame eyelet bolts (38) are removably attached to the power end frame upper portion (28) to facilitate lifting of the pump (10).

Main Bearing Assembly and Drive Shaft

The main bearing assembly (40) is fixedly attached to the power end frame (24) and permits rotation of the drive shaft (42) relative to the power end frame (24). The drive shaft (42) can be indirectly or directly connected to a power source (not shown) to provide input torque to drive rotation of the drive shaft (42). In the exemplary embodiment shown in the Figures, the drive shaft (42) has splines that mesh with complementary mating splines on a drive shaft of a gear box (not shown) in driving engagement with a rotating part of the power source to transfer torque from the power source to the drive shaft (42). The gearbox (not shown) may have a gear housing that removably attaches to the torque plate (30). Any appropriate power source (e.g., an internal combustion engine or an electrically powered motor) capable of controlling the rotational speed of drive shaft (42) can be used.

Reciprocating Pump Component

Figure 3:
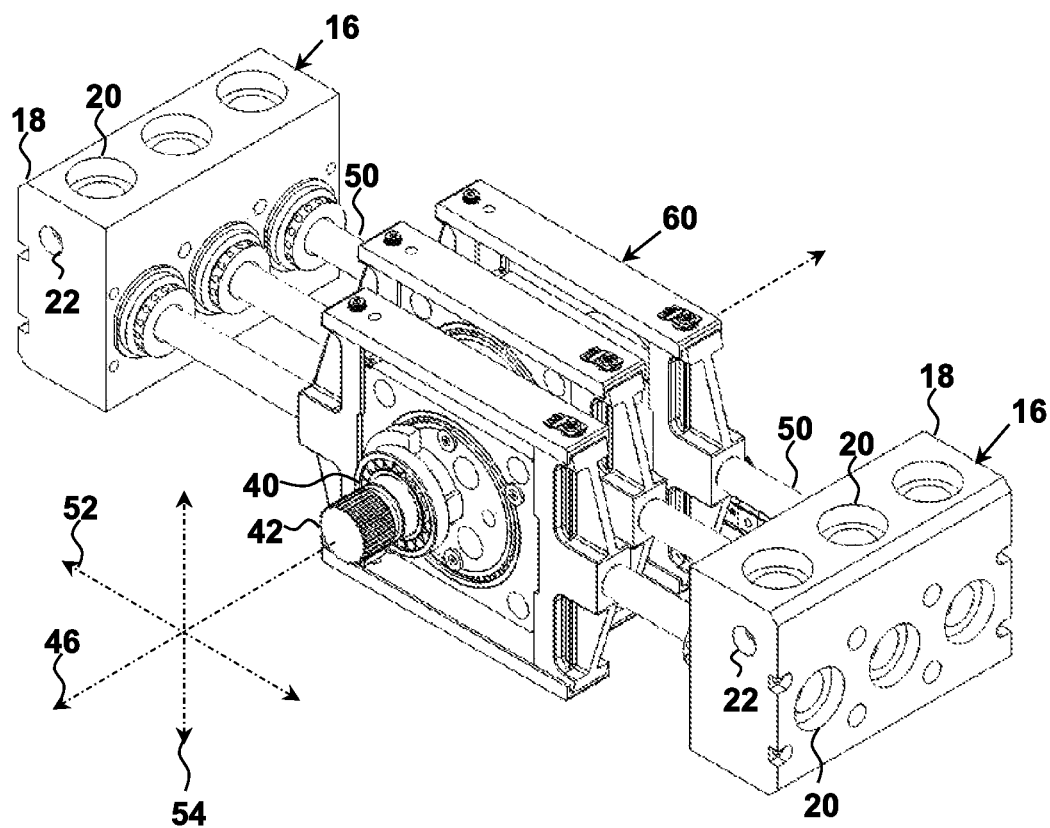
FIG. 3 is a perspective view of the drive mechanism module, plunger rods and the fluid end assembly block of the pump shown in FIG. 1.
Figure 4:
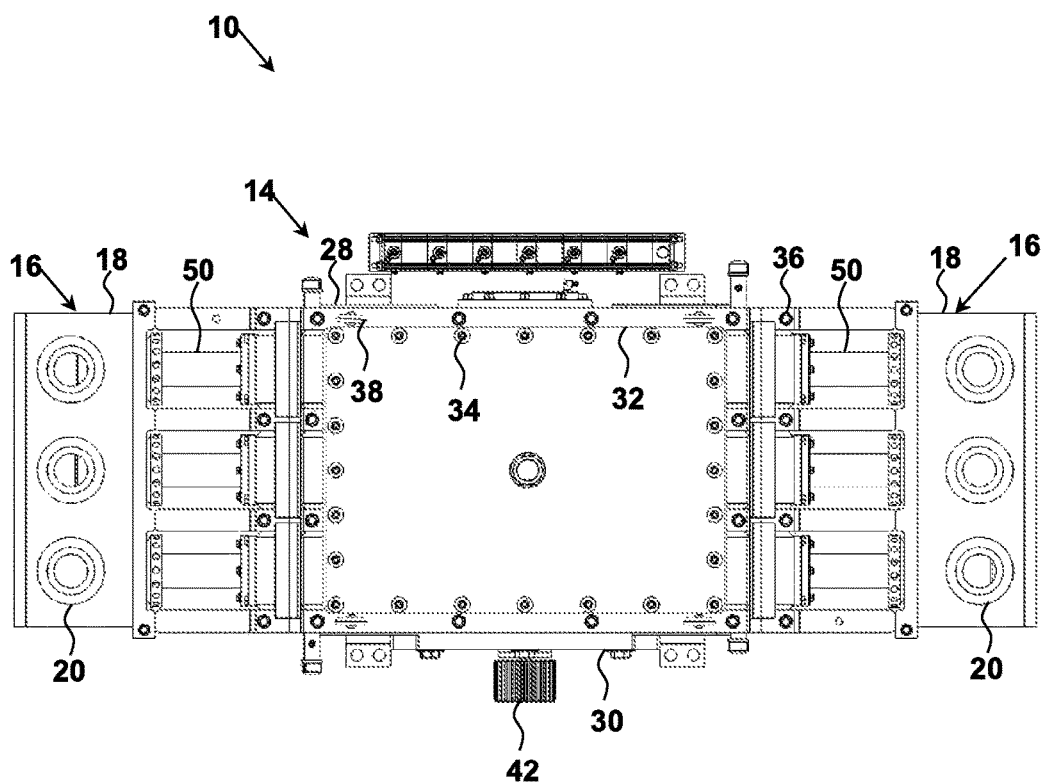
FIG. 4 is a top plan view of the pump shown in FIG. 1.
Figure 5:
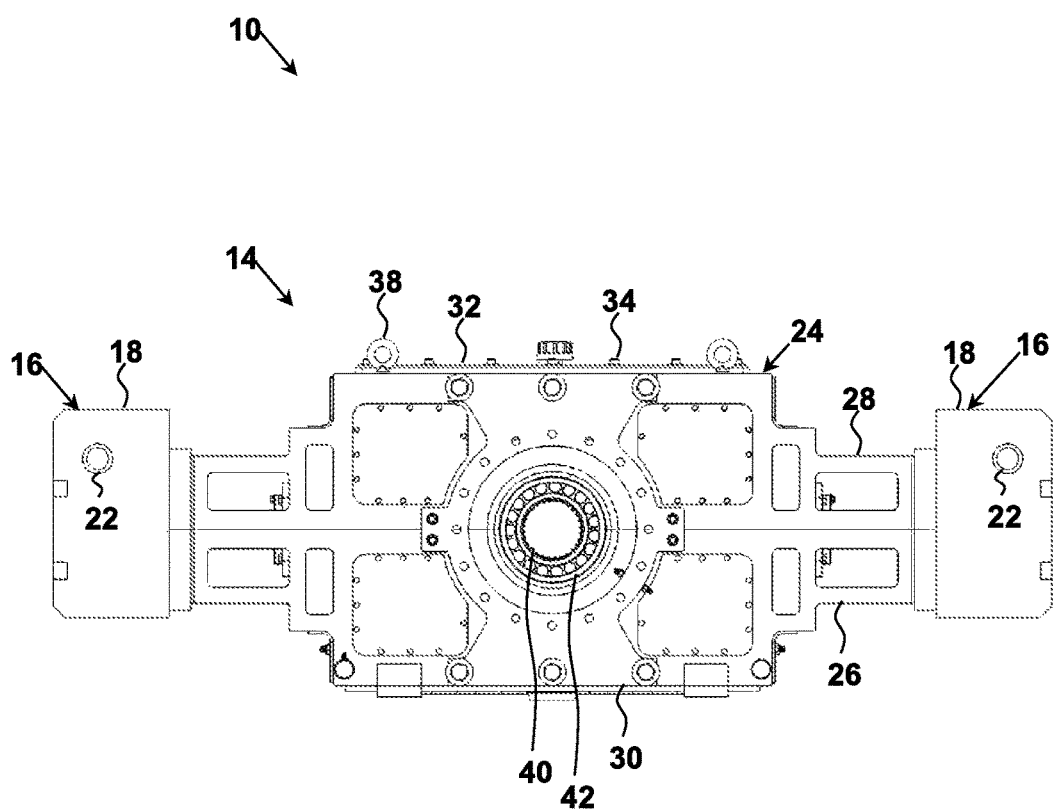
FIG. 5 is a front elevation view of the pump shown in FIG. 1.
Figure 6:
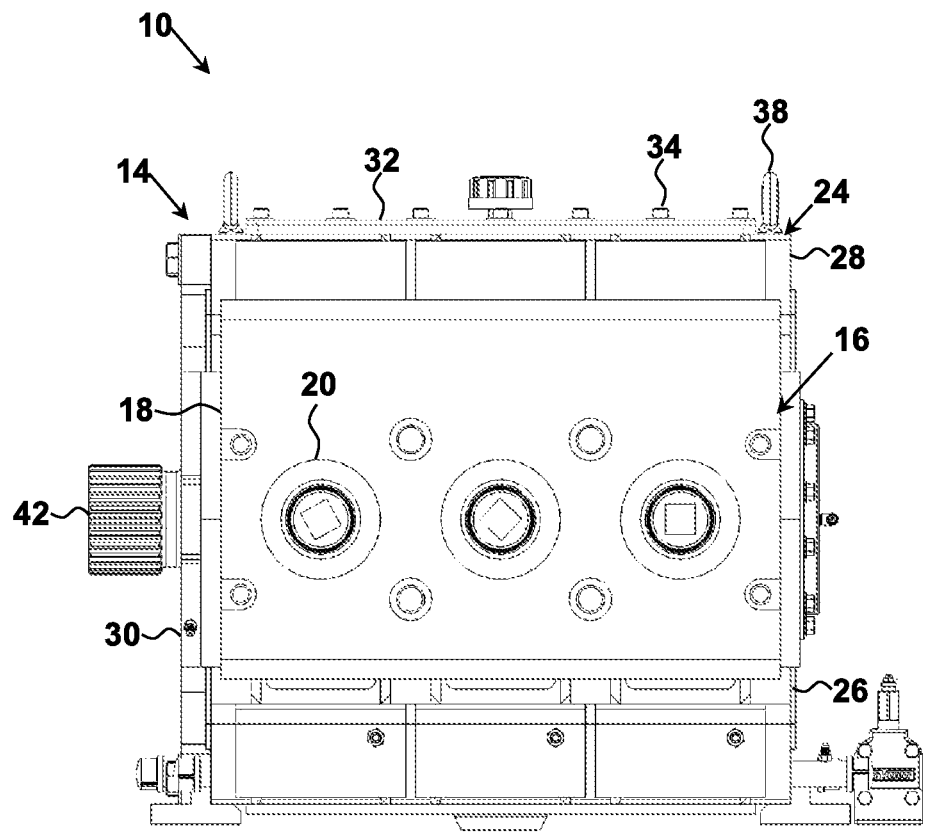
FIG. 6 is a side elevation view of the pump shown in FIG. 1.

The reciprocating pump component (50) is driven by a drive mechanism module (60) to linearly reciprocate in a first transverse direction perpendicular to the drive shaft axis (46) to displace the working fluid. At the same time, however, the reciprocating pump component (50) is limited in movement relative to the drive shaft (42) in a second transverse direction that is different from the first transverse direction. Referring to FIG. 3, in the exemplary embodiment, the pump (10) has moveable pump components in the form of plunger rods (50) that reciprocate in a horizontal first transverse direction (52), while being limited against movement in a vertical second transverse direction (54), where both the first and second transverse directions are perpendicular to the horizontally oriented drive shaft axis (46). As the plunger rods (50) linearly reciprocate in the horizontal first transverse direction (52), working fluid is alternately drawn into or displaced out of the fluid end assembly blocks (18).

The pump (10) may have a plurality of reciprocating pump components (50), with some or all of the reciprocating pump components (50) driven by a common drive mechanism module (60) or different drive mechanism modules (60). In the exemplary embodiment shown in FIG. 3, the pump (10) has six plunger rods (50) arranged in a triplex configuration of three pairs of plunger rods (50), with the plunger rods (50) of each pair opposed to each other and driven by one of the three drive mechanism modules (60). In other embodiments (not shown), the pump (10) may have a fewer number or a greater number of reciprocating pump components (50). For example, in another embodiment (not shown), the pump (10) may have ten plunger rods (50) arranged in a quintuplex configuration of five pairs of opposed plunger rods (50), with the plunger rods (50) of each pair opposed to each other and driven by one of five drive mechanism modules (60).

In embodiments, the plunger rods (50) that are driven by a common drive mechanism module (60) may have the same or different size from one another. In further embodiments, the plunger rods (50) that are driven by different drive mechanism modules (60) may have the same or different sizes as each other. As such, by selecting the number of plunger rods (50), the size of each plunger rod (50), and whether or not the plunger rods (50) are driven by a shared drive mechanism module (60), the pump (10) may be configured to have a desired combination of pump parameters such as pump size, pump volumetric output and pump power.

Drive Mechanism Module

Figure 7:
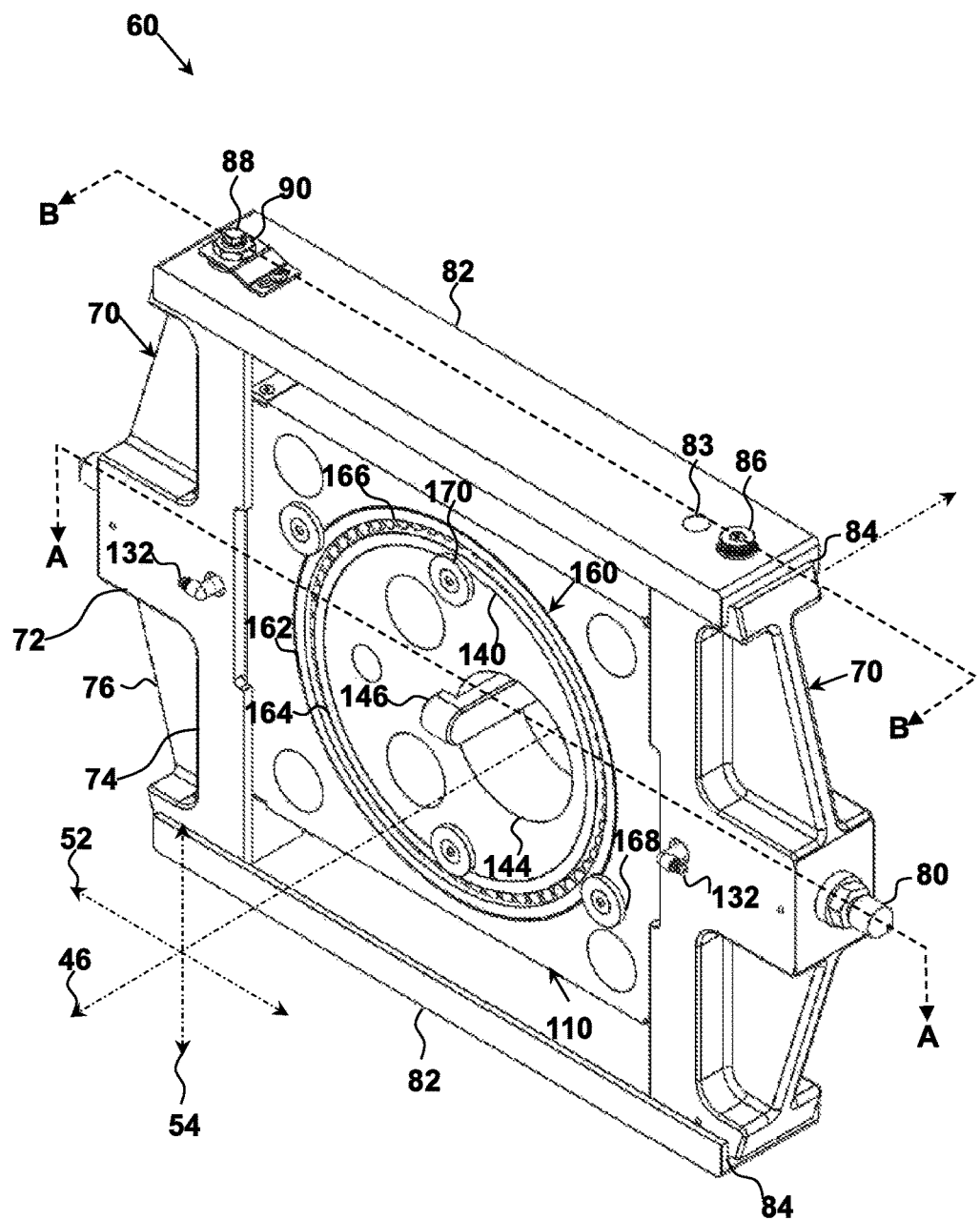
FIG. 7 is a perspective view of the drive mechanism module of the pump shown in FIG. 1.

Each drive mechanism module (60) converts rotational movement of the drive shaft (42) to linear reciprocal movement of at least one reciprocating pump component (50) in the first transverse direction. Referring to FIG. 7, in the exemplary embodiment, each drive mechanism module (60) comprises a connection member (70), a translating member (110), a rotating member (140), and a rotary bearing assembly (160).

Connection Member

Figure 8:
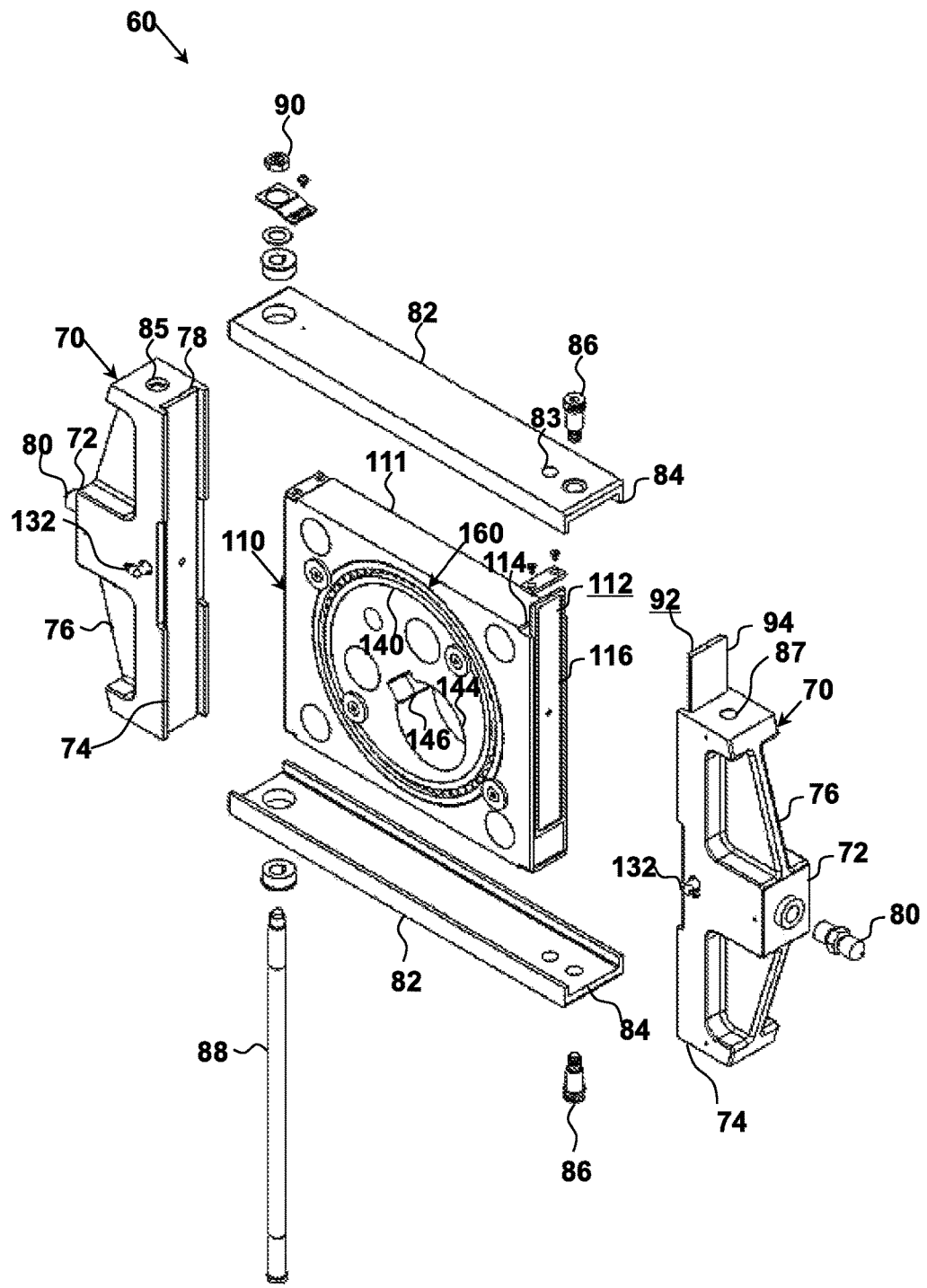
FIG. 8 is an exploded perspective view of the drive mechanism module shown in FIG. 7.

The connection member (70) attaches to at least one reciprocating pump component (50). Referring to FIG. 8, in the exemplary embodiment, each drive mechanism module (60) has two connection members (70). Each connection member (70) is in the form of a T-shaped member having a horizontally extending connection member first leg (72), a vertically extending connection member second leg (74), and connection member webs (76) that reinforce the junction between the connection member first leg (72) and the connection member second leg (74). The connection member second leg (74) defines a C-shaped connection member channel (78) in a horizontal cross-section, which faces towards and receives a vertical edge of the translating member (110). In embodiments, the two connection member (70) may be identical or non-identical with each other.

The connection member (70) may be either permanently or removably attached to one or more reciprocating pump components (50). Referring to FIG. 8, in the exemplary embodiment, each connection member (70) is removably attached to one of the plunger rods (50) by means of a connection member stud (80) that projects from the connection member first leg (72) into a receiving hole of the plunger rod (50). When the connection member (70) and the plunger rod (50) are so connected, the connection member stud (80) limits movement of the connection member (70) relative to the plunger rod (50) in the vertical second transverse direction (54). In other embodiments, the connection member (70) may be removably attached by other suitable means known in the art.

Figure 11:
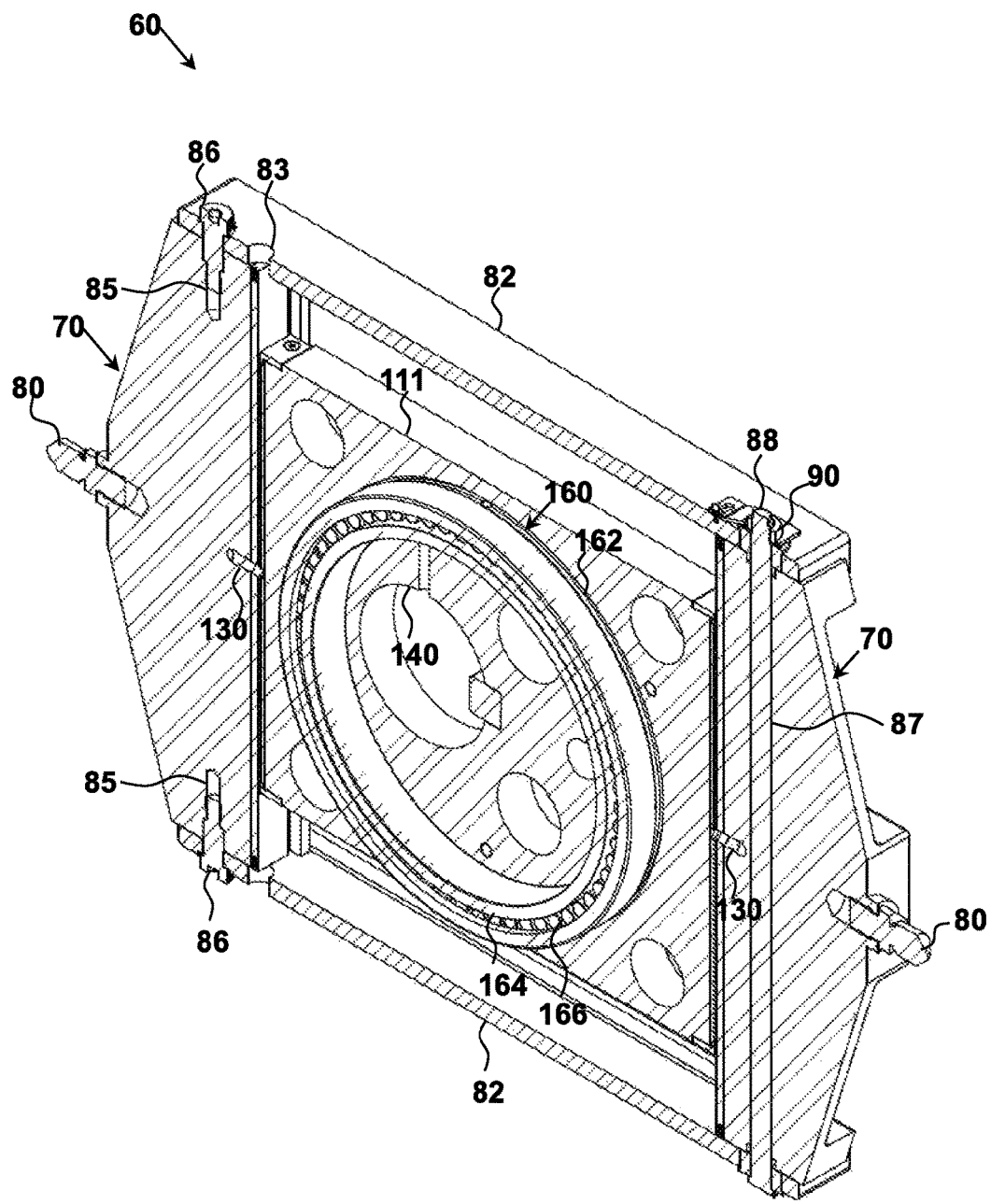
FIG. 11 is a perspective sectional view of the drive mechanism module shown in FIG. 7 as viewed along line B-B in FIG. 7.
Figure 12:
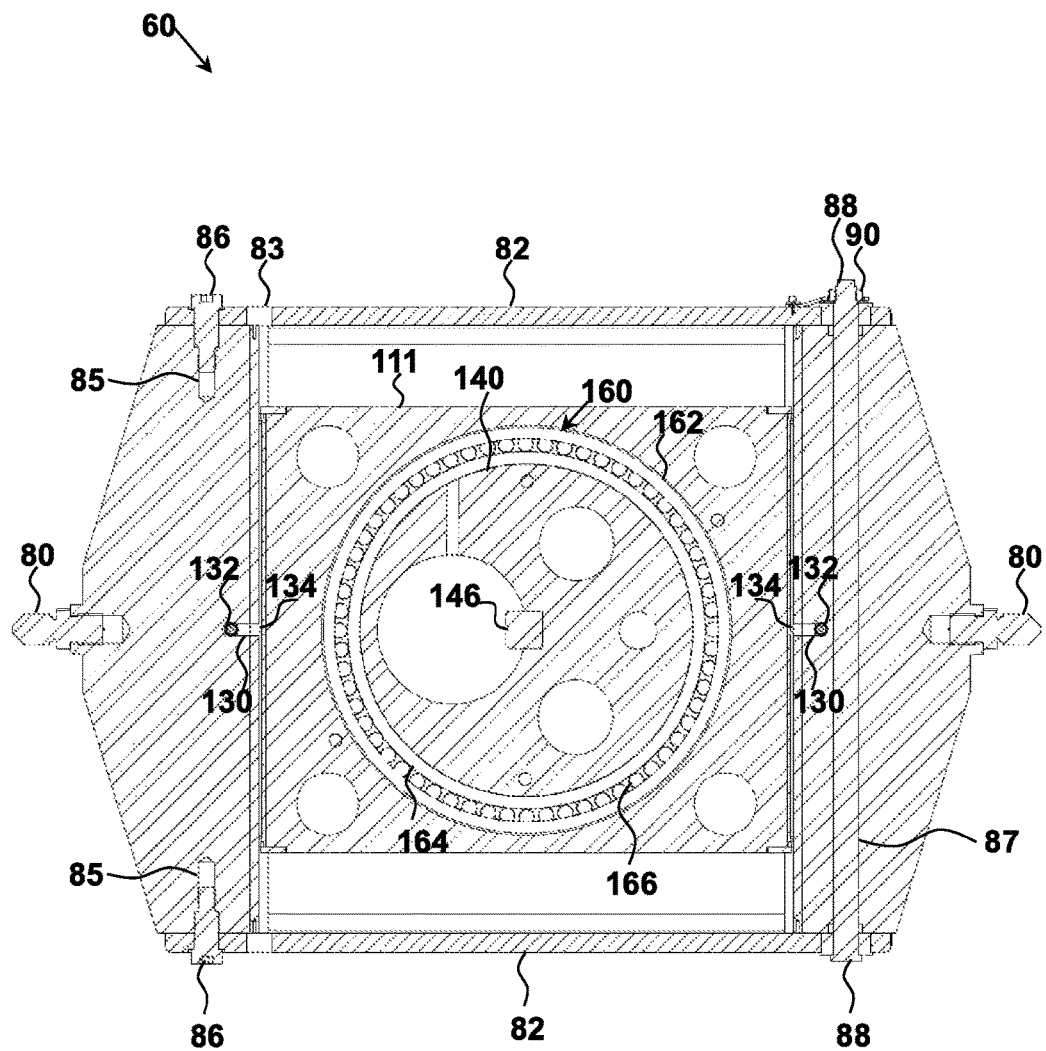
FIG. 12 is an elevation sectional view of the drive mechanism module shown in FIG. 7 as viewed along line B-B in FIG. 7.

In embodiments, the connection member (70) may form part or all of a connection member assembly that transversely surrounds the translating member (110) in a frame-like manner. Referring to FIG. 7, in the exemplary embodiment, the connection member assembly further comprises connection member assembly cross-members (82). Referring to FIG. 8, in the exemplary embodiment, each connection member assembly cross-member (82) extends in the horizontal first transverse direction and defines a C-shaped connection member assembly cross-member channel (84) in a vertical cross-section. The upper connection member assembly cross-member channel (84) faces towards and receives the upper ends of the connection members (70), while the lower connection member assembly cross-member channel (84) faces towards and receives the lower ends of the connection members (70). Referring to FIG. 11, the two connection members (70) are substantially similar to each other except that one of the connection members (70) defines a pair of tapped holes (85) for receiving a pair of threaded shoulder bolts (86) that removably attach one end of the each of the connection member assembly cross-members (82), while the other one of the connection members (70) defines a through hole (87) that receives a cam rod (88) that attaches the opposite end of the connection assembly cross-members (82) and is secured in the through hole (87) by a threaded nut (90). By virtue of their attachment to the connection assembly cross-members, the two connection members (70) will move in unison with each other.

Translating Member

The translating member (110) is in engagement with the connection member (70) for transferring bearing forces in the first transverse direction to the connection member (70), while translationally movable in the second transverse direction relative to the connection member (70). Referring to FIG. 7, the translating member (110) engages the connection members (70) to transfer forces in the horizontal first transverse direction (52) to the connection member (70), while translationally moving in the vertical second transverse direction (54) relative to the connection members (70). In the exemplary embodiment, the translating member (110) has a rectangular (more particularly, a square) shape in a vertical cross-section, and defines a translating member aperture that receives the rotary bearing assembly (160) and the rotating member (140), and allows for through passage of the drive shaft (42). In other embodiments, the translating member (110) may have a different shape, and attach to the rotary bearing assembly (160) in a different manner.

Bearing Engagement of the Translating Member with the Connection Member

Referring to FIG. 8, in the exemplary embodiment, the bearing relationship between the translating member (110) and the connection member (70) occurs at an interface between a connection member engagement surface (92) and an opposed translating member engagement surface (112), which are slideable relative to each other for relative translational movement in the second transverse direction between the connection member (70) and the translating member (110). The connection member engagement surface (92) may be integral with the connection member (70). Alternatively, in the exemplary embodiment as shown in FIG. 8, the connection member (70) comprises a connection member first part (72, 74, 76, collectively) and a removably attached connection member second part (94) that comprises the connection member engagement surface (92). In the exemplary embodiment, the connection member second part (94) is in the form of a wear plate made of a suitably wear resistant material such as a metal alloy including but not limited to hardened steel (e.g., fully hardened steel or case-hardened steel). In the exemplary embodiment shown in FIGS. 13 and 14, the connection member second part vertical edges (96) are beveled so that it can be slideably inserted and retained within the complementary shaped connection member channel (78) without the need for additional fasteners. In an analogous manner, the translating member engagement surface (112) may be integral with the translating member (110). Alternatively, in the exemplary embodiment as shown in FIG. 8, the translating member (110) comprises a translating member first part (111) and a removably attached translating member second part (116) that comprises the translating member engagement surface (112). In the exemplary embodiment, the translating member second part (116) is in the form of a wear plate made of a suitably wear resistant material such as a metal alloy including but not limited to an aluminum bronze bearing alloy. In the exemplary embodiment shown in FIGS. 15 and 16, the translating member second part vertical edges (118) are beveled so that it can be slideably inserted and retained within a complementary shaped translating member channel (114). The translating member second part (116) is additionally secured to the sliding member first part (111) by keeper plates and threaded bolts.

Adjustment of Connection Member Engagement Surface Relative to Translating Member Engagement Surface The drive mechanism module (60) may comprise adjustment means for adjusting the clearance between the connection member engagement surfaces (92) and the translating member engagement surfaces (112). In the exemplary embodiment, the adjustment means comprises a cam rod (88) that is disposed within an aperture extending vertically through the connection member (70) and that abuts against the internal walls of the connection member (70) defining the aperture. The cam rod (88) has a non-circular cross-section in horizontal plane. Accordingly, rotation of the cam rod (88) urges the connection member engaging surface (92) in the horizontal first transverse direction (52) either towards or away from the translating member engagement surface (112). In the exemplary embodiment, the upper connection member assembly cross-member (82) defines a connection member assembly cross-member aperture (83) aligned with the interface of the connection member engagement surface (92), and the translating member engagement surface (112). The connection member assembly cross-member aperture (83) allows for the insertion of a feeler gauge (not shown) between the connection member engagement surface (92), and the translating member engagement surface (112). When the clearance between the connection member engagement surface (92) and the translating member engagement surface (112) is at a desired distance, the rotational position of the cam rod (88) may be fixed by tightening of the threaded nut (90). The clearance between the connecting member engagement surface (92) and the translating member engagement surface (112) may be selected for a fluid bearing between the connecting member engagement surface (92) and the translating member engagement surface (112), as is discussed below.

Bearing Fluid Path

In the exemplary embodiment, the drive mechanism module (60) defines a bearing fluid path (130) for use with a bearing fluid system (not shown) comprising a bearing fluid pump and a bearing fluid line that circulates bearing fluid under high pressure to the bearing fluid path (130). In embodiments, the bearing fluid may be a liquid (e.g., a hydraulic fluid such as water or oil). In the exemplary embodiment shown in FIGS. 10, 11 and 12, each connection member (70) defines a bearing fluid path (130) extending from a bearing fluid path inlet (132) for connection to a bearing fluid supply line (not shown) to a bearing fluid path outlet (134) at the interface between the connection member engagement surface (92) and the translating member engagement surface (112).

Figure 13:
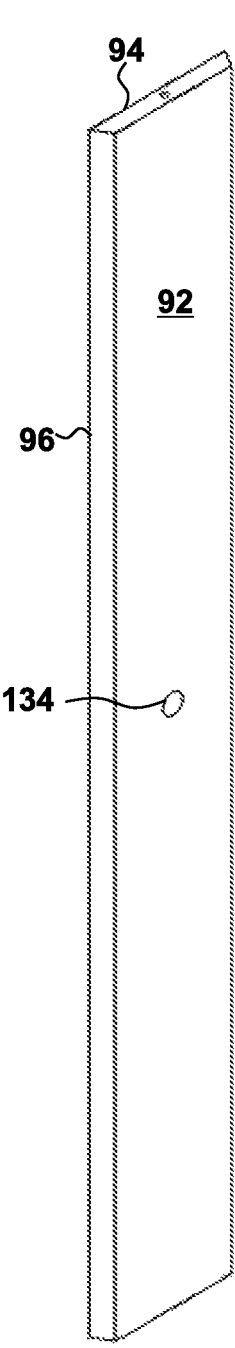
FIG. 13 is a perspective view of an embodiment of a connection member wear plate of the drive mechanism module shown in FIG. 7.
Figure 14:
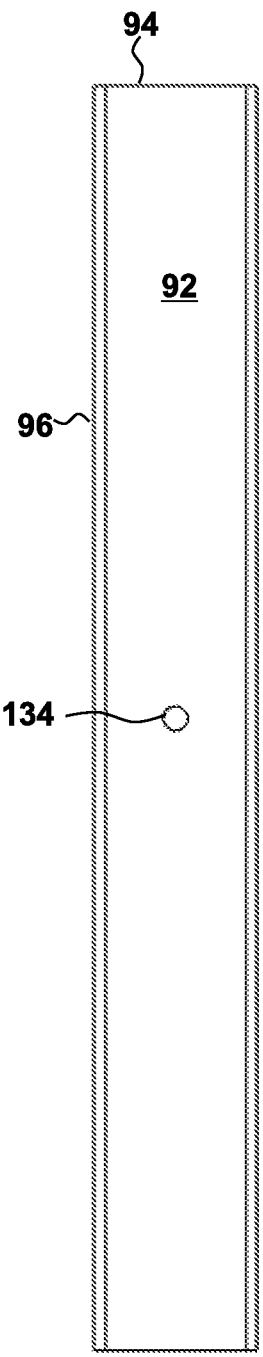
FIG. 14 is an elevation view of the connection member wear plate shown in FIG. 13.
Figure 15:
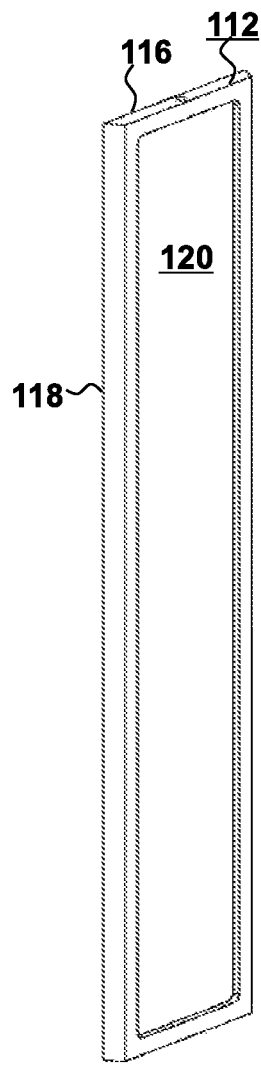
FIG. 15 is a perspective view of an embodiment of a translating member wear plate of the drive mechanism module shown in FIG. 7.
Figure 16:
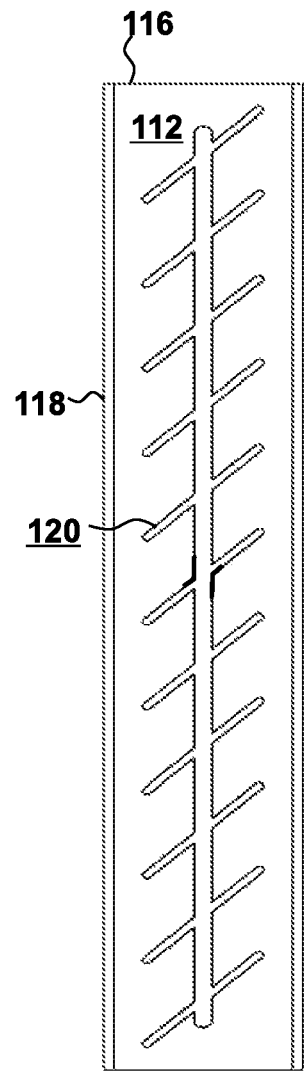
FIG. 16 is an elevation view of another embodiment of a translating member wear plate of the drive mechanism module shown in FIG. 7.

In the exemplary embodiment shown in FIGS. 13 and 14, the connection member engagement surface (92), as formed by the connection member wear plate (94) is substantially flat. In the exemplary embodiments shown in FIGS. 15 and 16, the translating member engagement surface (112) may define a translating member engagement surface recess (120). In embodiments, the translating member engagement surface recess (120) may be configured as a rectangular pocket (as shown in FIG. 15) or a series of parallel, angled, grooves interconnected by a central vertically-oriented groove (as shown in FIG. 16).

Use and Operation of the Drive Mechanism

Figure 9A:
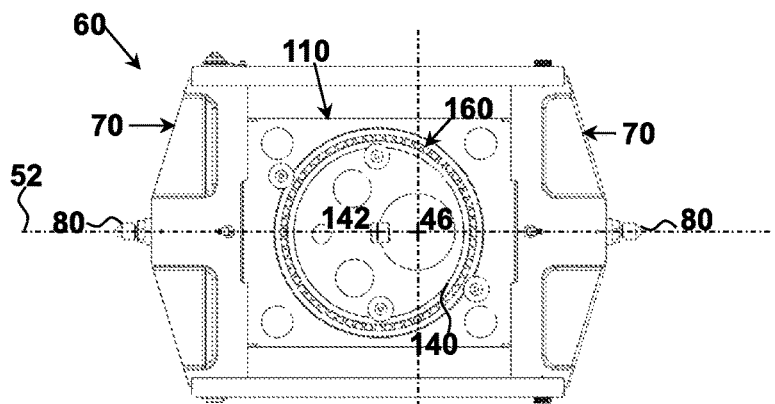
FIGS. 9A-9D are front elevation views of the drive mechanism module shown in FIG. 7 at different phases of motion.
Figure 9B:
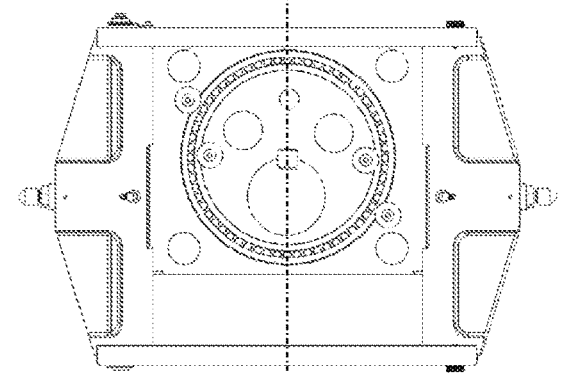
Figure 9C:
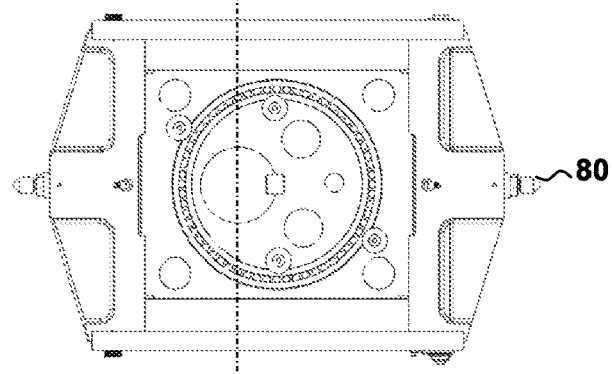
Figure 9D:
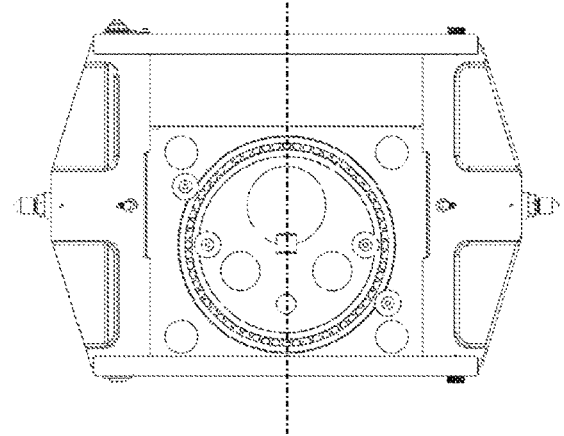
Figure 10:
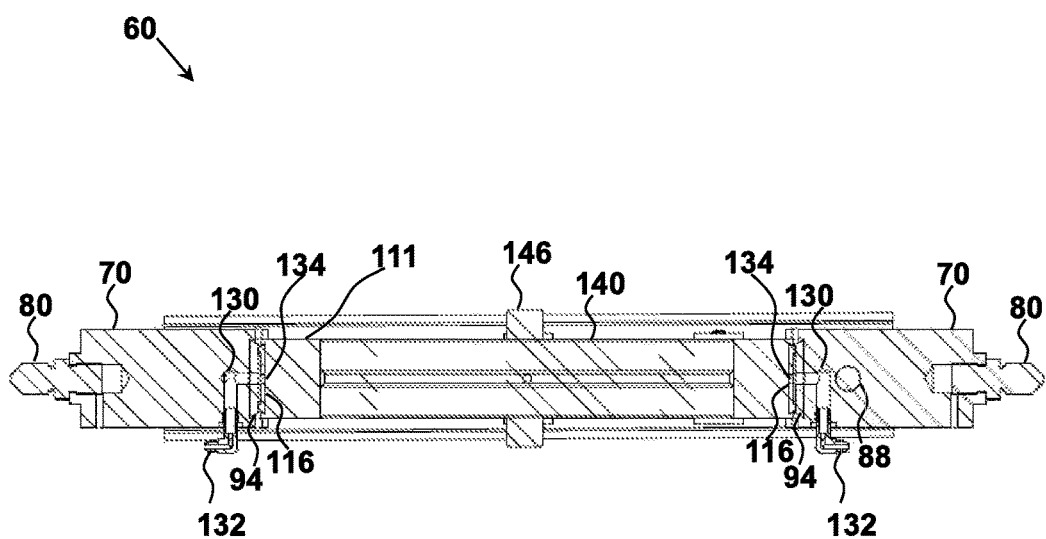
FIG. 10 is a sectional view of the drive mechanism module shown in FIG. 7 as viewed along line A-A in FIG. 7.

FIGS. 9A-9C show different phases of movement of the exemplary embodiment of the drive mechanism module (60) in use and operation as the drive shaft (42) rotates in a clockwise direction. FIGS. 9A-9C omit the drive shaft (42) and the plunger rods (50) for clarity, but it will be understood that in use and operation, the drive shaft (42) passes through the rotating member aperture (144) with the drive shaft axis (46) oriented perpendicularly to the plane of the drawing plane, and that a plunger rod (50) is attached to each of the connection members (70) as shown in FIG. 3. Rotation of the drive shaft (42) about the drive shaft axis (46) drives rotational movement of the rotating member center (142) about the drive shaft axis (46). As the rotating member (140) rotates, it generates transverse bearing forces that are transmitted by the rotary bearing assembly (160) to the translating member (110), while the rotary bearing assembly (160) permits rotation of the rotating member (140) about the rotating member (140) center relative to the translating member (110). The translating engagement of the translating member (110) with the connection members (70) permits reciprocating movement of the translating member (110) in the vertical second transverse direction (54), such that the translational movement of the translating member (110) drives reciprocating movement of the connection member (70) only in the horizontal first transverse direction (52).

In embodiments, the connection member engagement surface (92) and the translating member engagement surface (112) may be in direct contact with each other so as to create a mechanical bearing therebetween. In other embodiments, a bearing fluid system (not shown) can be used to circulate a bearing fluid under pressure via the bearing fluid path (130) to the interface between the connection member engagement surface (92) and the translating member engagement surface (112) as the drive mechanism (60) is in motion. The bearing fluid may be used to reduce frictional forces and transfer heat away from the interface of the connection member engagement surface (92) and the translating member engagement surface (112).

In embodiments, a fluid bearing may be created between the connection member engagement interface (92) and the translating member engagement interface (112). In comparison with a mechanical bearing, a fluid bearing may potentially allow for lower friction, less wear, and greater damping between the connection member engagement surface (92) and the translating member engagement surface (112).

In one embodiment, a bearing fluid pump (not shown) may be used to circulate the bearing fluid with sufficient pressure through from the bearing fluid path inlet (132) to the bearing fluid path outlet (134) to create a pressurized layer of bearing fluid that separates the connection member engagement surface (92) from the translating member engagement surface (112) so as to create a hydrostatic fluid bearing between the connection member engagement surface (92) and the translating member engagement surface (112). A translating member engagement surface recess (120) configured as a rectangular pocket (as shown in FIG. 15) may be particularly suited to creating a hydrostatic fluid bearing.

In another embodiment, the drive mechanism module (60) may be operated under such conditions that the translating member engagement surface (112) moves relative to the connection member engagement surface (92) at a speed that is sufficient to create a pressurized layer of bearing fluid that separates the connection member engagement surface (92) from the translating member engagement surface (112) so as to create a hydrodynamic fluid bearing between the connection member engagement surface (92) and the translating member engagement surface (112). A translating member engagement surface recess (120) configured as a series of grooves (as shown in FIG. 16) may be suited to creating a hydrostatic fluid bearing.

The creation of a fluid bearing between the connection member engagement surface (92) and the translating member engagement surface (112) will depend on a combination of interrelated variables including the pressure of the bearing fluid, the flow rate of the bearing fluid and the distance between the connection member engagement surface (92) and the translating member engagement surface (112) at their interface. The flow rate of bearing fluid must be maintained at a non-zero rate while the translating member engagement surface (112) slides relative to the connection member engagement surface (92), and as such, some bearing fluid must be allowed to escape the interface. This escaping bearing fluid may be collected and circulated back to the interface. The pressure and flow rate of the bearing fluid that is circulated may be monitored and controlled such as by controlling the power output of a pump (not shown) used to circulate the bearing fluid. The clearance between the connection member engagement surface (92) and the translating member engagement surface (112) must be non-zero to allow for escape of bearing fluid at the interface, but sufficiently small to create a very thin layer of bearing fluid therebetween. For example, in an exemplary use of the exemplary embodiment of the pump (10) having six interfaces of connection member engagement surfaces (92) and translating member engagement surfaces (112), the bearing fluid may be circulated at a pressure of about 17,000 (kPa) (about 2,500 psi) and a flow rate in the range of about 11 to about 15 liters per second (about 3 to about 4 U.S. gallons per minute), and the clearance between the connection member engagement surface (92) and the translating member engagement surface (112) may be about 25 µm (about 0.001 inch), while the translating member (110) moves at a speed relative to the connection member (70) of about 0.125 meters per second (about 25 feet per minute). For a particular embodiment, it will be within the skill of a person of ordinary skill in the art to select an appropriate combination of the pressure and the flow rate of the bearing fluid and the clearance between connection member engagement surface (92) and the translating member engagement surface (112) to create a fluid bearing therebetween.

With use, the drive mechanism module (60) may require servicing, maintenance or repair. For these purposes, the drive mechanism module (60) may be accessed by removing the power frame end cover (32) from the power end frame upper portion (28). For example, if the connection member engagement surface (92) and the translating member engagement surface (112) are eroded by friction, the clearance between the connection member engagement surface (92) and the translating member engagement surface (112) can be re-adjusted by rotation of the cam rod (88) as previously described. Alternatively, the connection member wear plate (94) and the translating member wear plate (116) may be removed from the drive mechanism module (60) for servicing or replacement. Alternatively, the power end frame upper portion (28) may be removed from the power end frame lower portion (26), and the drive shaft (42) so that that one or more drive mechanism modules (60) may be removed from the pump (10) for serving or replacement.

The drive mechanism module (60) of the present invention may possibly provide for numerous of potential advantages relative to reciprocating pumps in the prior art driven by crankshaft mechanisms. These potential advantages may include the ability for a single drive mechanism module (60) to drive a pair of opposed plunger rods for opposed fluid end assemblies. Further potential advantages may include increased smoother overall operation (e.g., reduced accelerations of internal mechanisms by approximately 20-25% compared to known pumps), which may allow for smoother working fluid discharge leading to reduced pulsations in the fluid end assembly, and reduced vibration in the discharge piping, and extension of the pump life. Further potential advantages may include a reduction in the number and complexity of parts, which may allow for greater ease of repair and maintenance, a decrease in capital costs for repair and maintenance, and a more robust design that can operate for longer intervals before the need for repair and maintenance. Further potential advantages may include a reduced pump size (e.g., a plan area footprint reduction of approximately up to 10% and weight reduction of approximately 20-25% compared with known pump configurations having comparable pump capacity, as would be achieved when two conventional pumps are combined), which may allow for greater ease of transport.

PARTS LIST

| Number | Name |
|---|---|
| 10 | pump |
| 12 | |
| 14 | power end assembly |
| 16 | fluid end assembly |
| 18 | fluid end assembly block |
| 20 | fluid end assembly block access ports |
| 22 | fluid end assembly block outlet ports |
| 24 | power end frame |
| 26 | power end frame lower portion |
| 28 | power end frame upper portion |
| 30 | power end frame torque plate |
| 32 | power end frame cover |
| 34 | power end frame cover bolts |
| 36 | power end frame bolts |
| 38 | power end frame eyelet bolts |
| 40 | main bearing assembly |
| 42 | drive shaft |
| 44 | drive shaft splines |
| 46 | drive shaft axis |
| 48 | |
| 50 | reciprocating pump component/plunger rods |
| 52 | first transverse direction |
| 54 | second transverse direction |
| 56 | |
| 58 | |
| 60 | drive mechanism module |
| 62 | |
| 64 | |
| 66 | |
| 68 | |
| 70 | connection member |
| 72 | connection member first leg |
| 74 | connection member second leg |
| 76 | connection member web |
| 78 | connection member channel |
| 80 | connection member stud |
| 82 | connection member assembly cross-member |
| 83 | connection member assembly cross-member aperture |
| 84 | connection member assembly cross-member channel |
| 85 | tapped hole for threaded shoulder bolt |
| 86 | threaded bolt |
| 87 | through hole for cam rod |
| 88 | cam rod |
| 90 | threaded nut |
| 92 | connection member engagement surface |
| 93 | connection member first part |
| 94 | connection member second part/wear plate |
| 96 | connection member second part/wear plate vertical edges |
| 98 | |
| 100 | |
| 102 | |
| 104 | |
| 106 | |
| 108 | |
| 110 | translating member |
| 111 | translating member first part |
| 112 | translating member engagement surface |
| 114 | translating member channel |
| 116 | translating member second part/wear plate |
| 118 | translating member second part/wear plate vertical edges |
| 120 | translating member engagement surface recess |
| 122 | |
| 124 | |
| 126 | |
| 128 | |
| 130 | bearing fluid path |
| 132 | bearing fluid path inlet |
| 134 | bearing fluid path outlet |
| 136 | |
| 138 | |
| 140 | rotating member |
| 142 | rotating member center |
| 144 | rotating member aperture |
| 146 | rotating member key |
| 148 | |
| 150 | |
| 152 | |
| 154 | |
| 156 | |
| 158 | |
| 160 | rotary bearing assembly |
| 162 | rotary bearing assembly outer race |
| 164 | rotary bearing assembly inner race |
| 166 | rotary bearing assembly rolling elements |
| 168 | outer clamping bolts |
| 170 | inner clamping bolts |
| 172 | |
| 174 | |
| 176 | |
| 178 | |
| 180 | |
| 182 | |
| 184 | |
| 186 | |
| 188 | |
| 190 | |
| 192 | |
| 194 | |
| 196 | |
| 198 | |
| 200 | |

The embodiments of the invention in which an exclusive property or privilege is claimed are defined as follows:

1. A drive mechanism module for use in a reciprocating pump comprising a drive shaft and at least one reciprocating pump component, the drive shaft defining a drive shaft axis of rotation and transverse directions perpendicular to the drive shaft axis, the at least one reciprocating pump component reciprocatingly moveable relative to the drive shaft in a first transverse direction while limited in movement relative to the drive shaft in a second transverse direction different from the first transverse direction, the drive mechanism module comprising:
   (a) at least one connection member removably attachable to the at least one reciprocating pump component and forming part or all of a connection member assembly that transversely surrounds a translating member, the at least one connection member comprising a first connection member for connection to a first reciprocating pump component, and a second connection member for connection to a second reciprocating pump component, wherein the first and reciprocating pump components are opposed to each other in the first transverse direction;
   (b) the translating member in bearing engagement with the connection member for transferring bearing forces in the first transverse direction from the translating member to the connection member while translationally movable in the second transverse direction relative to the connection member, the translating member defining a translating member aperture that receives a rotary bearing assembly and a rotating member, and allows for through passage of the drive shaft;
   (c) the rotating member coupled to the drive shaft for rotation with the drive shaft, the rotating member having a rotating member center transversely eccentric to the drive shaft axis;
   (d) the rotary bearing assembly attached to the translating member and the rotating member to permit rotation of the rotating member about the rotating member center relative to the translating member, while transferring transverse bearing forces from the rotating member to the translating member; and
   wherein rotation of the rotating member with the drive shaft drives transverse reciprocating motion of the translating member to drive reciprocating movement of the connection member in the first transverse direction while the translating member reciprocatingly translates in the second transverse direction relative to the connection member; and
   wherein the connection member comprises a connection member first part and a connection member second part, wherein the connection member second part is removably attached to the connection member first part, and comprises a connection member engagement surface, and the translating member comprises a translating member engagement surface opposite the connection member engagement surface, wherein the translating member engagement surface interfaces with the connection member engagement surface for transferring bearing forces in the first transverse direction from the translating member to the connection member, and the translating member engagement surface slides relative to the connection member engagement surface for translational movement of the translating member in the second transverse direction relative to the connection member.

2. The drive mechanism module of claim 1 wherein the translating member comprises a translating member first part and a translating member second part, wherein the translating member second part is removably attached to the translating member first part and comprises the translating member engagement surface.

3. The drive mechanism module of claim 1 wherein the connection member is selectively movable relative to the translating member for adjusting the distance between the connection member engagement surface and the translating member engagement surface.

4. The drive mechanism module of claim 3 further comprising a cam rod selectively rotatable to displace the connection member engagement surface relative to the translating member engagement surface.

5. The drive mechanism module of claim 1 wherein the connection member defines a bearing fluid path extending from a bearing fluid path inlet to a bearing fluid path outlet in fluid communication with a space between the connection member engagement surface and the translating member engagement surface.

6. The drive mechanism module of claim 1 wherein the rotating member defines a rotating member aperture for removably mounting the rotating member on the drive shaft.

7. The drive mechanism module of claim 1 wherein the rotary bearing assembly comprises a rotary bearing assembly outer race for attachment to the translating member, a rotary bearing inner race for attachment to the rotating member, and a plurality of rotary bearing assembly bearing elements to permit relative rotation between the rotary bearing assembly outer race and the rotary bearing assembly inner race.

8. A reciprocating pump assembly comprising:
   (a) a power end frame;
   (b) a drive shaft defining a drive shaft axis of rotation and transverse directions perpendicular to the drive shaft axis, the drive shaft rotatable relative to the power end frame,
   (c) at least one reciprocating pump component reciprocatingly moveable relative to the drive shaft in a first transverse direction while limited in movement relative to the drive shaft in a second transverse direction different from the first transverse direction;
   (d) at least one drive mechanism module comprising:
      (i) at least one connection member for attachment to the at least one reciprocating pump component;
      (ii) a translating member in bearing engagement with the connection member for transferring bearing forces in the first transverse direction from the translating member to the connection member while translationally movable in the second transverse direction relative to the connection member;
      (iii) a rotating member coupled to the drive shaft for rotation with the drive shaft, the rotating member having a rotating member center transversely eccentric to the drive shaft axis;
      (iv) a rotary bearing assembly attached to the translating member and the rotating member to permit rotation of the rotating member about the rotating member center relative to the translating member, while transferring transverse bearing forces from the rotating member to the translating member; and
   wherein rotation of the rotating member with the drive shaft drives transverse reciprocating motion of the translating member to drive reciprocating movement of the connection member in the first transverse direction while the translating member reciprocatingly translates in the second transverse direction relative to the connection member; and wherein the connection member defines a bearing fluid path extending from a bearing fluid path inlet to a bearing fluid path outlet in fluid communication with a space between the connection member engagement surface and the translating member engagement surface.

9. A method for converting rotational motion of a drive shaft defining a drive shaft axis of rotation and transverse directions perpendicular to the drive shaft axis to reciprocating movement of a reciprocating pump component in a first transverse direction, the reciprocating pump component limited in movement in the second transverse direction relative to the drive shaft, the method comprising the steps of:

(a) rotating the drive shaft about the drive shaft axis to drive rotation of a rotating member having a rotating member center transversely eccentric to the drive shaft axis;

(b) allowing rotation of the rotating member to drive reciprocating transverse movement of a translating member;

(c) allowing reciprocating movement of the translating member to drive reciprocating movement in the first transverse direction of a connection member attached to the reciprocating pump component, while allowing the translating member to reciprocatingly translate in the second transverse direction relative to the connection member by relative sliding of a translating member engagement surface and a connection member engagement surface; and (d) concurrently with steps (a) to (c) circulating a bearing fluid under pressure to a space between the connection member engagement surface and the translating member engagement surface.

10. The method of any one of claim 9 wherein the bearing fluid is circulated under pressure sufficient to create a hydrostatic fluid bearing between the connection member engagement surface and the translating member engagement surface.

11. The method of claim 9 wherein the translating member reciprocatingly translates in the second transverse direction relative to the connection member at a speed sufficient to create a hydrodynamic fluid bearing between the connection member engagement surface and the translating member engagement surface.

* * * * *